March 17, 1953 P. G. GLEASON 2,631,375
ENGRAVING MACHINE
Filed April 23, 1949 3 Sheets-Sheet 2

Inventor
PAUL G. GLEASON

By Sellers & Latta
Attorneys

Patented Mar. 17, 1953

2,631,375

UNITED STATES PATENT OFFICE 2,631,375

ENGRAVING MACHINE

Paul G. Gleason, Van Nuys, Calif.

Application April 23, 1949, Serial No. 89,235

14 Claims. (Cl. 33—25)

This invention relates to a modified pantograph type engraving machine. Its general object is to provide an inexpensive, portable machine for precision engraving, routing or carving from a master copy (pattern, sample part, illustration or printed matter) in true proportions, to a larger or smaller scale. It is especially useful for engraving plastic display signs.

I use the term "modified pantograph" to designate a linkage which, unlike the five pivot pantograph of conventional engraving machines, utilizes only four pivot joints. I thereby obtain not only the advantage of a reduction in friction and the total error tending to arise from any slight looseness in the pivots (which is reduced to such an exceedingly small figure as to be negligible) but also the more important advantage of making it possible to embody in the machine a novel counterbalance arrangement that is readily adjustable for counterbalancing the machine in all the enlarging and reducing ratios, thereby requiring a minimum of manipulating force for engraving operations. Accordingly, one of the important objects of my invention is to provide an engraving machine having an improved, adjustable counterbalancing arrangement.

Another object is to provide such a machine having a supporting fulcrum about which the machine may be tilted from a horizontal working position to an at-rest position in which it is tilted upwardly away from the worktable to permit adjustment or interchange of work pieces.

A further object is to provide an engraving machine which permits ready interchange of the engraving tool holder and the tracer point holder from a reducing to an enlarging position and vice versa.

Another object is to provide an engraving machine having means for receiving and mounting a conventional engraving tool with its drive motor.

Another object is to provide an engraving machine which is adapted to make an enlarged or reduced replica of a three dimensional object, with true proportioning in all three dimensions.

Another object is to provide an engraving machine that is adapted to utilize any selected one of several different electric hand motor tools now available on the market.

Another object is to provide, in an engraving machine, a novel and improved depth gage for adjustably determining the depth of an engraving tool relative to a work surface.

Another object is to provide, in an engraving machine, a novel yielding tracer point.

Another object is to provide an engraving machine having a maximum number of interchangeable parts, reducing production and servicing costs.

Other objects will become apparent in the ensuing specifications and appended drawings in which.

Figure 1:
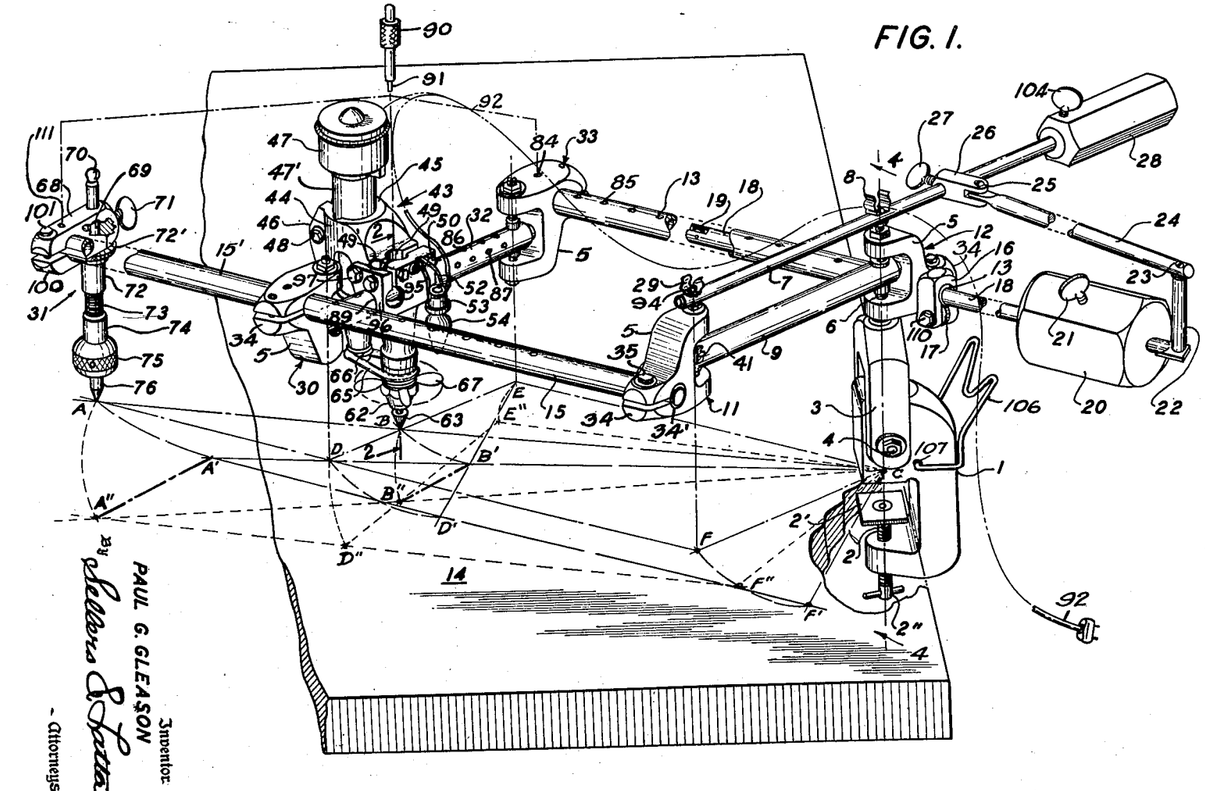
Fig. 1 is a perspective view of an engraving machine embodying my invention with the parts arranged for reduction copying in connection with a schematic diagram illustrating the principle of operation.

Referring now to the drawings in detail, and in particular to Fig. 1, the numeral 1 indicates a fulcrum base clamp on which the entire machine is mounted and balanced. The clamp 1 is of C form, having a lower arm through which is threaded a clamp screw 2, with a handle 2'' and a swivel jaw 2', the latter adapted to engage the underside of an easel or worktable 14, while the upper face of the easel is engaged by a jaw integral with the upper arm of the base clamp 1.

The operating linkage

Figures 2, 3, 3A:
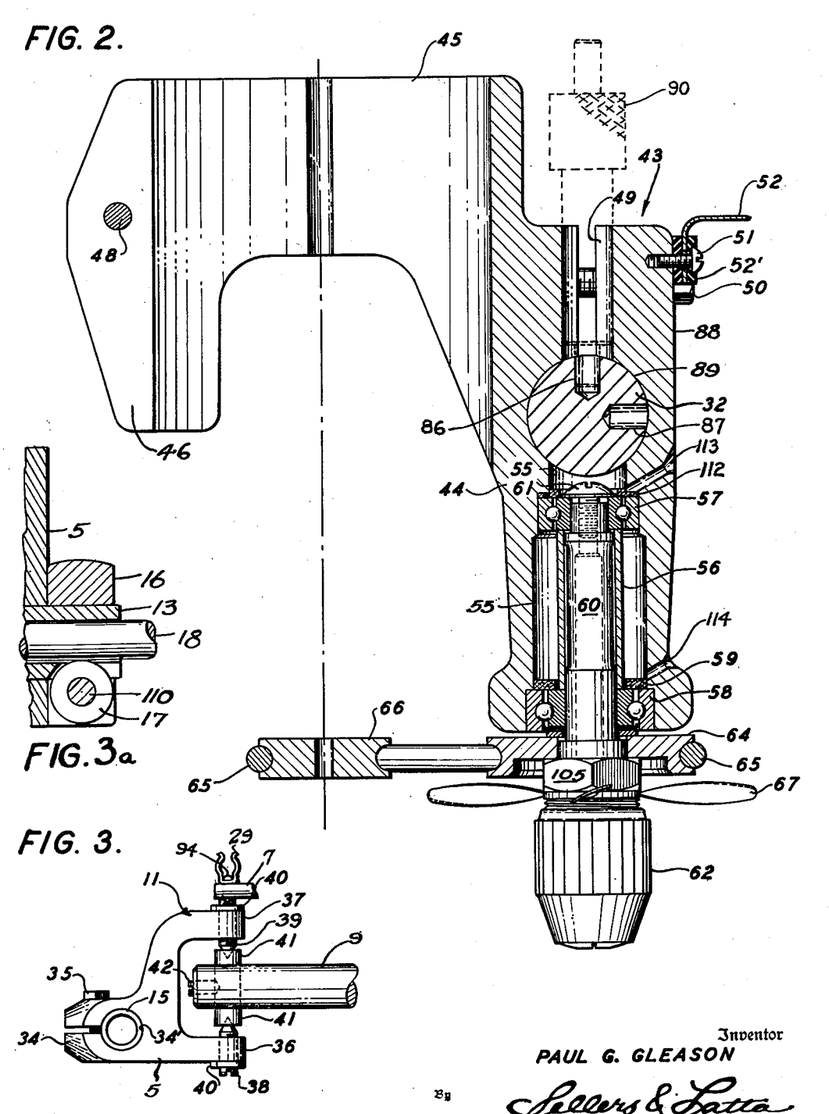
Fig. 2 is a detail sectional view of the engraving tool spindle and chuck assembly taken on the line 2—2 of Fig. 1.
Fig. 3a is a detail sectional view of the outer roller bearing of the telescoping adjustable counterbalance arm.
Fig. 3 is a detail view of one of the linkage joints.

The operating linkage is mounted, for pivotal movement about an upright axis, upon a fulcrum yoke 3 (Fig. 4) which is hinged on a horizontal axis to the base clamp 1 by means of a pair of pivots 4 in the form of screws threaded through the arms of yoke 3 and secured by lock nuts 4', the inner ends of pivots 4 being conical and being received in bearing recesses in the ends of a bearing stud 4'' which is press fitted in an opening in the upper arm of fulcrum base clamp 1. Pivots 4 are identical and interchangeable with pivots 38 (Fig. 3).

The operating linkage includes a clevis 5 which is pivotally mounted on the fulcrum yoke 3 by means of a post 6. Post 6 (Fig. 4) has at its upper end a threaded portion engaged with the lower arm 36 of clevis 5. Secured between nuts 78 and 79 and washers 80 on the post 6 is a bearing 81 which is rotatably mounted within a bushing 82 press fitted into the shoulder of yoke 3.

The operating linkage is of parallelogram form, including inner arms 9 and 13, and outer arms 32 and 15 which are parallel respectively to arms 9 and 13. The inner end of arm 13 projects through and is secured in clevis 5. Arm 9 is pivotally connected to clevis 5 on the upright fulcrum axis of post 6 by means of a pivot bearing 41 (Fig. 4) press fitted in an opening extending transversely through arm 9, and having at its respective ends conical bearing recesses in which are engaged the conical points of post 6 and of a pivot stud 39. Stud 39 is threaded through the upper arm 37 of clevis 5 and is secured by a lock nut 40. Stud 39 has in its outer end a screw driver slot 83 whereby it may be adjusted. The parts just described constitute a fulcrum pivot 12 by which the operating linkage is pivotally connected to the fulcrum yoke 3.

Arms 13 and 15 will occasionally be referred to herein as "longitudinal" arms and arms 9 and 32 as "cross" arms.

The clevis 5 and most of the other parts just described are utilized in pivotal connections 11, 30 and 33 which respectively connect arms 9 and 15, arms 15 and 32, and arms 32 and 13. Identical parts in each of these respective pivotal connections (Fig. 3) include clevises 5, studs 39, lock nuts 40 and bearings 41. The identical parts also include, on each clevis 5, a split sleeve 34 having a bore 34' (offset from and at right angles to axis of pivots 38 and 39) in which an arm 15 (or 13, as the case may be) is received and secured by a clamp screw 35. The pivotal connections 30 and 33 differ from the pivotal connections 11 and 12 in that the clevises 5 thereof are inverted with reference to the clevises 5 of connections 11 and 12. Consequently, the arm 32 is disposed in a plane below that of arms 13 and 15, while arm 9 is disposed in a plane above that of arms 13 and 15.

In the pivotal connections 11, 30 and 33, instead of the post 6, a stud 38 (Fig. 3) similar to stud 39, is threaded through arm 36 of clevis 5 and has a pointed end bearing in a conical recess in bearing 41; set screw 42 at one end of arm 32 (or 9) secures a removable bearing pin 41 to permit passage of the clamp 68 (Fig. 5) or 44 (Fig. 2) when they are interchanged.

Figures 4, 5, 6, 7, 8:
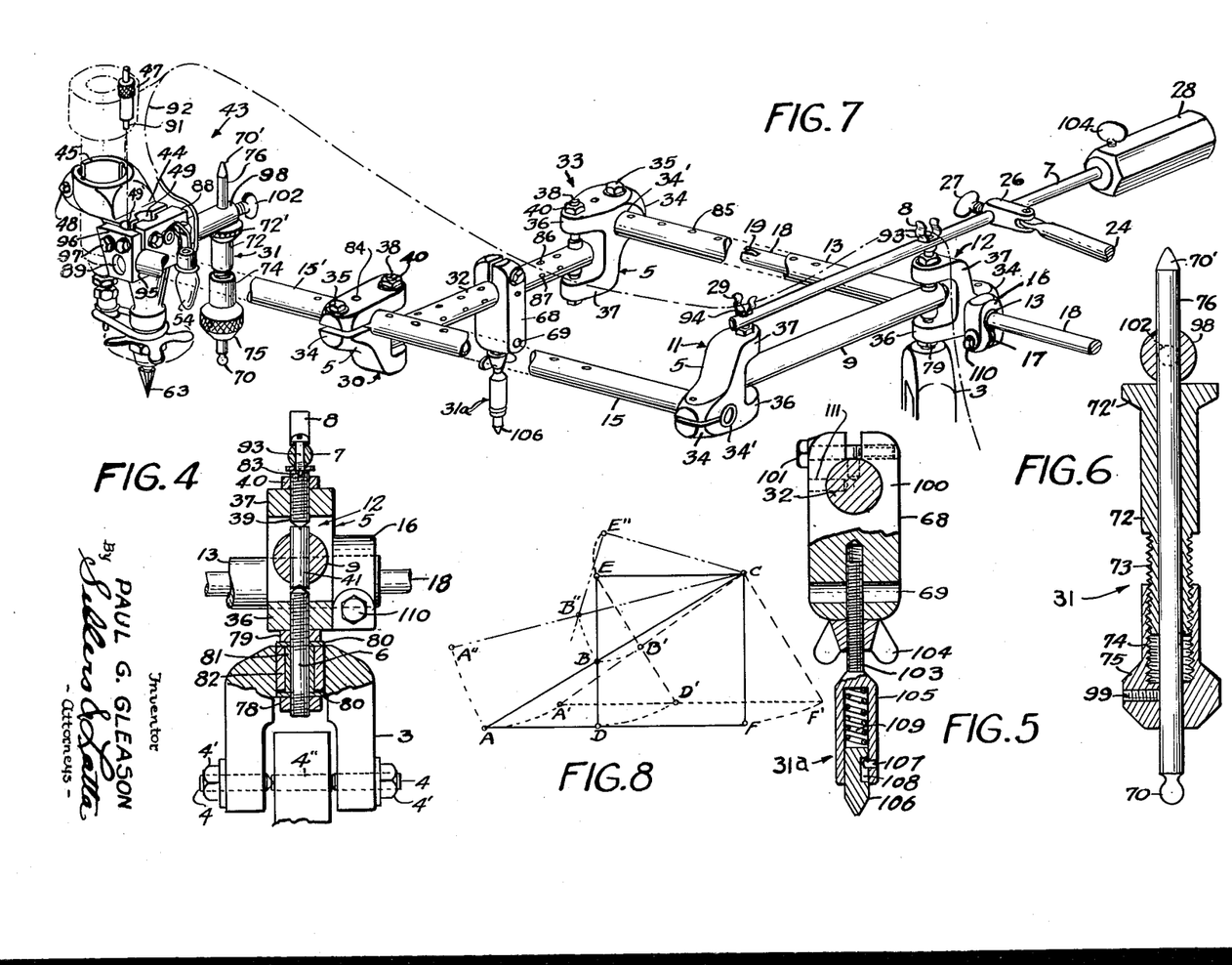
Fig. 4 is a detail part sectional view of the fulcrum joint of the operating linkage taken on the line 4—4 of Fig. 1.
Fig. 5 is a detail part sectional view of the spring cushioned tracer point.
Fig. 6 is a detail sectional view of the depth gage with tracer pin.
Fig. 7 is a perspective view of the machine set for enlarging.
Fig. 8 is a schematic diagram illustrating the principle of operation of the machine.

Arm 15 (Figs. 1 and 7) is extended through its pivotal connection 30 to provide an extension arm 15'. On the end of the extension arm 15' there may be mounted, selectively, either a tracer point 31 (Fig. 1) or a motor driven engraving unit 43 (Fig. 7). Where the tracer point 31 is mounted on extension arm 15', engraving unit 43 is mounted on cross arm 32 (Fig. 1), and where engraving unit 43 is mounted on the end of extension arm 15', either a spring cushioned tracer unit 31a or a rigid tracer pin not shown is mounted in clamp 68 on cross arm 32 (Fig. 7). The arrangement shown in Fig. 1 is for reduction reproduction, and the arrangement shown in Fig. 7 is for enlargement reproduction. A spring cushioned tracer 31a is preferred for following, without side play, the V groove of a master copy of two dimensional form, while a rigid tracer pin replaces 31a for three dimensional contour enlarging.

Adjustment of the enlargement (or reduction) ratio is effected by loosening clamp screws 35 of pivotal connections 30 and 33 and sliding the clevises 5 of these connections bodily along arms 13 and 15. These positions may be selected for major increments of adjustment by inserting the tip of a locating pin 91 through index openings 84 in clevises 5 and through coded registering index openings 85 in arms 13, 15. Simultaneously with the adjustment of arm 32 toward or away from arm 9, the engraving (or tracer) unit carried by arm 32 is adjusted along arm 32 so as to maintain the axis of this unit in alignment with the axis of the tracer (or engraving) unit carried at the end of extension arm 15' and with the axis of center pivot 12, respectively. For determining the principal positions of this adjustment, two series of correspondingly coded locating index holes 86 and 87 are provided in the arm 32, which mate with socket 49 of engraving unit 43 and index hole 111 of tracer clamp 68, respectively.

Engraving unit

The engraving unit 43, shown best in Fig. 1, is constructed so as to utilize most commercially available electric hand motor tools which include a small high speed electric motor 47, and casing 47' forming a bearing for the motor shaft and chuck which is adaptable to carry an arbor with a drive pulley 66. This unit in itself constitutes no part of the present invention. To utilize this motor drive unit, my invention provides a bracket 44 (Fig. 2) having a split sleeve 88 provided with a bore 89 which receives the arm 32. The sleeve 88 is clamped on arm 32 by clamp screws 50. A locating pin 90 is receivable in a socket 49 in sleeve 88 and has a reduced end 91 adapted to enter any one of a series of openings 86 in arm 32.

Bracket 44 is provided with a split sleeve 45 with its axis at right angles and offset to that of bore 89, motor casing 47' being receivable in sleeve 45 and clamped therein by a clamp bolt 48 extending through ears 46 of sleeve 45. In a series of stepped counterbores 55 (Fig. 2) parallel to the axis of sleeve 45 and in axial alignment with socket 49 intersecting axis of bore 89 in bracket 44, are mounted bearings 57 and 58 which contact at their upper side felt oil retainers 112 and 59 connecting with oil holes 113 and 114 respectively. There is in turn rotatably mounted a hollow spindle 60 secured by means of clamp screw 61 threaded into its upper end and a bearing spacer sleeve 56, between spindle bearings 57 and 58. The spindle 60 at its lower end carries a tool chuck 62, a chip blower fan 67, and a pulley 64 which is in a position to align with pulley 66 of motor 47 when the latter is mounted in sleeve 45. A small drive belt 65 connects pulleys 64 and 66. Chuck 62 is adapted to hold an engraving tool 63. Chip blower fan 67 is rotatably mounted on spindle 60 and for safety, if accidentally contacted, derives its driving torque from spindle 60 solely by frictional engagement with the underside of wrench grip section 105 on spindle 60 caused by the reactive thrust of the air propelled over the work by the fan.

For illuminating the work, the engraving unit 43 provides a bracket 52, holding a small electric socket 53 and lamp 54. The bracket 52 (Fig. 2) is secured between vibration insulating washers 52' (e. g. of soft rubber) which in turn are secured to the face of bracket 44 by a screw 51. The bracket 52 has a flexibility which cooperates with the cushioning action of washers 52' to insulate the lamp 54 from filament damaging motor tool vibration. An electric service cord 92 supplies current to lamp 54 and motor 47 through the parallel branch connections indicated. The service cord 92 has an intermediate portion thereof flexibly supported in clips 8 and 29 which are pivotally attached to the upper end of studs 39 (Figs. 3 and 4) by means of screws 93 and 94 respectively, threaded into the upper ends of studs 39.

It may now be noted that the bore 89 (Fig. 1) provides for mounting the engraving unit 43 on arm 32 with the axes of engraving tool 63 and motor 47 disposed upright, and that by removing index pin 90 and loosening cap screws 50, the engraving unit may be slid to any selected position on arm 32 and relocated by the insertion of index pin 90 in index hole 86 and reclamped in the new position by tightening screws 50.

The engraving unit bracket 44 has, in addition to the bore 89, a second bore 95 the axis of which is disposed at right angles to that of bore 89 and to the tool axis (2—2) from which it is offset. Bore 95 is formed in a secondary split sleeve which embodies a lip 96 adapted to be drawn toward the main split sleeve 88 by clamp screws 97 extended through lip 96 and threaded into sleeve 88. In the arrangement of Fig. 7, bore 95 receives the end of extension arm 15', where a locating hole mates with socket 49' by means of index pin 91, and bore 89 receives one end of a support arm 98 the other end of which has a transverse opening to receive the shaft 76 of the depth gage.

*The depth gage*

The depth gage 31 (Fig. 6) embodies a shaft 76 having at one end a polished, rounded bearing head 70 and having at its other end a tracer point 70'. The shaft 76 passes through the bore of a knurled gripping knob 75 which is secured thereto by a set screw 99. The knob 75 has an extension collar 74 into which is threaded the reduced end 73 of a sleeve 72. Sleeve 72 has at its other end a graduated dial 72' with a knurled edge grip. Shaft 76 extends freely through sleeve 72. In the use of the depth gage 31 as a tracer point, as in Fig. 1, the tracer point 70' is at the lower end of the shaft and the upper end projects from sleeve 72 through a bore 69 in a clamp 68. The clamp 68 has a clamp screw 71 threaded through one end thereof for engagement with the shaft 76 in bore 69. The other end of the clamp 68 is formed with a split sleeve 100 which is disposed with its axis offset and at right angles to that of bore 69 and is adapted to receive the end of extension arm 15'. Split sleeve 100 is clamped on arm 15' by a clamp screw 101 and is located with index pin 91 through opening 111 registering an index hole located in arm 15' at the extreme outer end. When the clamp 68 is used in this manner it will be adjusted so that shaft 76 is disposed upwardly on that side of arm 15' which is towards arm 13.

When combination unit 31 is used as a depth gage on engraving unit 43 (Fig. 7) (i. e., for two dimensional enlarging) the position of shaft 76 within sleeve 72 and knob 75 is reversed, end for end, with bearing head 70 in position to bear against the work surface, and with the other end of the shaft extending through a support arm 98 which is clamped in bore 89 of engraving unit 43. Shaft 76 is secured therein by a clamp screw 102 threaded into the end of arm 98 and clamping on shaft 76. Arm 98 is of sufficient length to position the bearing head 70 adequately away from the engraving tool 63 to avoid interference with the engraving operation.

Where the unit 31 is employed as a depth gage (i. e., for enlarging in two dimensions only), I utilize the yielding tracer 31a shown in detail in Fig. 5. This unit utilizes the clamp 68, the split sleeve 100 being, in this case, clamped upon cross arm 32. The clamp screw 71 is replaced by the threaded shank 103 of tracer point 31a. By rotating the shank 103 in its thread the tracer point can be retracted or extended with reference to clamp 68. It is locked in its adjusted position by a wing nut 104. Projecting from the shank 103 is a socket 105 in which is slidably mounted a tracer point 106. A key 107, engaged in a longitudinal slot 108 in tracer point 106, secures the tracer point against dropping out of the socket 105. A compression spring 109, engaged between the end of the tracer point 106 and the bottom of socket 105, yieldingly presses the tracer point into the depression of the template to be enlarged. Thus the tracer point may be maintained in intimate association with the V-grooved template irrespective of any height irregularities occurring between the template and the work surface, and the engraving tool 63 may likewise be operated at a uniform depth in the work, as determined by the setting of depth gage 31. Tracer 31a is replaced by a rigid tracer, not shown, when enlarged contour copying in three dimensions is done.

The height setting of depth gage 31 may be adjusted relative to extension arm 15' by loosening thumb screw 71 (or 102) and by holding the knob 75 in the fingers of one hand and rotating dial 72' with the fingers of the other hand. With support arm 98 (or bracket 68) resting on the upper end of dial 72' (the height of arm 98 or bracket 68) above bearing head 70 (or tracer point 70') will be determined by the position of adjustment of threaded sleeve 73 in mating collar 74. A zero reference is provided on 68 and 98 for positioning graduated dial 72'.

*Counterbalancing mechanism*

It may at this point be noted that the entire operating linkage, with the tracer point and engraving unit carried thereby (Fig. 1), is adapted to be freely moved vertically about the fulcrum axis of fulcrum pivots 4. It is obviously undesirable to impose the entire weight of the machine on the tracer point or engraving tool, and consequently I have provided mechanism for counterbalancing the machine so that the net load on the tracer point and engraving tool will be very slight, thereby increasing ease of manipulation.

The counterbalancing mechanism (Fig. 1) comprises a main counterweight 20 having a bore which receives an arm 18 on which it is secured in any selected position by means of a thumb screw 21. The arm 18 is slidably mounted within arm 13 which is tubular. The inner end of arm 18 is bifurcated and has mounted therein an anti-friction roller 19 which bears against the inner wall of the arm 13. The outer portion of arm 18 bears on a roller 17 (Fig. 3a) which is journalled between the legs of a split sleeve 16. Sleeve 16 straddles the end of arm 13 projecting from clevis 5, and is clamped thereon by a clamp screw 110. Screw 110 also functions as a shaft for roller 17.

Counterweight 20 counterbalances the component of weight of the machine which tends to tilt the linkage downwardly about an axis perpendicular to arm 13 and in a plane parallel to the plane of the arms 13 and 15. That is to say, the counterweight 20 tends to tilt arm 13 upwardly. A secondary counterweight 28 is provided, and its function is to counterbalance the component of the weight of the machine which tends to tilt the linkage downwardly about an axis perpendicular to arm 9 and in a plane parallel to the plane of the arms 13 and 15. Stated differently, counterweight 28 tends to tilt arm 9 upwardly. Counterweight 28 is mounted on the outward end of arm 7, where it is fixed by thumb screw 104. The other end of arm 7 is pivotally anchored to pivot connection 11 by means of a screw 94 passing through clip 29 and arm 7 and threaded into the upper end of stud 39 in the same manner as screw 93 of Fig. 4. Screw 94 provides a pivotal connection between arm 7 and pivot unit 11. Screw 93 passes through the intermediate portion of arm 7 as shown in Fig. 4, establishing a pivotal connection with center pivot 12. The counterweight 28 remains fixed on arm 7 for all positions of adjustment of arm 32 along arms 13, 15.

At this point it may be noted that the counterweights 20 and 28 will cooperate to exert a mean or resultant counterbalancing moment in a plane, which roughly bisects the parallelogram of arms 9, 13, 15 and 32, and also contains the axis of post 6. This counterbalancing plane also contains the axes of tracer unit 31 (or 31a) and of engraving tool 63, and intersects the work surface along the chart line A—C of Fig. 1. It is only the arms 13 and 15 which have their effective length varied in the adjustment of the reduction or enlargement ratio, while that of arms 9 and 32 remains constant. The lever arm about which a partial component of the total weight of the machine is acting, downwardly, lies in a plane perpendicular to post 6 and parallel to arm 9 and maintains a fixed ratio to the lever arm about which counterweight 28 is acting in opposition to this moment of force. Accordingly, the spacing of counterweight 28 relative to the fulcrum pivot axis (4—4) does not vary in the operation of the machine. On the other hand, the effective lever arm of the major remaining partial component of the total machine weight, acting downwardly, lies in a plane perpendicular to post 6 and parallel to arm 13 and varies constantly in accordance with the extending and retracting movement of the linkage away from and towards the fulcrum pivot. This is due primarily to the fact that in the extending and retracting movements all parts of the linkage swing in arcuate paths roughly parallel to the arm 13, thereby shifting the major component of the total machine weight to a considerable extent in a direction longitudinally of the arm 13 but not to any material extent in a direction transverse to the arm 13. To maintain the proper counterbalancing of the major component of the total weight which shifts generally parallel to the arm 13, I provide an automatic adjustment for the counterweight 20, by means of which the counterweight 20 is drawn away from the fulcrum pivot when the linkage is extended and is drawn toward the fulcrum pivot when the linkage is retracted. Thus as the engraving unit moves toward the fulcrum pivot, there will be a proportional movement of the counterweight 20 toward the fulcrum pivot and vice versa, maintaining a balance of the linkage about the fulcrum pivot. This automatic adjustment is provided for by a post 22 secured to and extending upwardly from arm 18, a connecting rod 24 pivoted at 23 to the upper end of post 22, and a coupling element 26 having a bifurcated end to which rod 24 is pivoted at 25, the coupling element 26 having a bore slidably receiving arm 7 and clamped thereto by a thumb screw 27. The coupling element 26 is secured to arm 7 between the fulcrum pivot and counterweight 28, and receives movement from arm 7 such as to slide arm 18 outwardly from arm 13 when the linkage is being extended and to slide arm 18 back into arm 13 when the linkage is being retracted.

The amplitude of compensating movement of counterweight 20 which is necessary to compensate for the extending and retracting movement of the linkage will vary in accordance with the ratio adjustment of arm 32 along arms 13, 15. The closer the arm 32 is to arm 9, the smaller will be the required amplitude of adjustment of counterweight 20. Conversely, as the arm 32 is adjusted away from arm 9, the amplitude of compensating movement of counterweight 20 must be increased in order to maintain the proper balancing action. Accordingly, the coupling element 26 is slidably adjustable along the arm 7 so as to vary the radius of swinging movement of coupling element 26 about the fulcrum pivot and thereby vary the amplitude of movement transmitted through connecting rod 24 for any given angular displacement of arm 7 with reference to arm 13. Thus as the arm 32 is adjusted away from arm 9 in setting the reduction of multiplication ratio, coupling element 26 will be correspondingly adjusted towards counterweight 28 to increase the amplitude of movement of counterweight 20, and vice versa.

This compensating movement of weight 20 plus a compound interaction between both counterweights 20 and 28 sufficiently approximates a uniform compensation which effects a substantially full counterbalancing action in all operating positions of the machine.

Horizontal static balance of the engraving machine assembly for a selected ratio of the linkage is obtained by setting the machine near midposition and sliding the main counterweight 20 along arm 18 until the system is in balance about the transverse horizontal fulcrum axis, and then clamping the weight 20 at this position on arm 18 with thumb screw 21. The range of compensating movement of counterweight 20 through telescopic movement of arm 18 is then adjusted by shifting element 26 along arm 7 and testing the balance around the horizontal axis for extreme positions of extension and retraction of the linkage. When the best position has been obtained, element 26 is secured to arm 7 by thumb screw 27.

*Operation*

The fundamental principle of operation of the linkage is the establishment of two proportional triangles, the respective corners of which are defined by the axes of three pivots C, E, F (Figs. 1 and 8), of the parallelogram and by the axis A of the part at the outermost point of extension arm 15' (tracer point or engraving tool). In the schematic diagram of Figs. 1 and 8, the outermost point (tracer point Fig. 1) (engraving tool Fig. 7) is designated A, and the axis of center pivot 12 and moving pivots 11, 30 and 33 are designated C, F, D, and E respectively. The axis of the part carried by arm 32 (tracer point Fig. 7) (engraving tool 63, Fig. 1) is indicated at B. Axis B always lies on the straight line A—C, extending between the outermost point A and the fulcrum axis C. For any adjustment of arm 32 along arms 13, 15, there must be a corresponding adjustment of the unit carried by arm 32 along arm 32 so as to maintain the in-line relation of points A, B and C. This may be done by laying out a line AC on the worktable and, for reduction copying (as in Fig. 1), setting tracer point A on the line and then adjusting engraving tool 63 so that its point also is on the line. A similar procedure for enlargement (as in Fig. 7) is followed.

Points A, B, C, E and F define the two proportionate triangles C—E—B and A—F—C respectively. Angle ECB is obviously the same as angle CAF, since arm EC is parallel to arm AF. (EC represents arm 13 of the linkage, and AF represents arms 15 and 15' of the linkage.) Likewise, hypotenuse BC is proportional to hypotenuse AC in the same ratio as arm EB is proportionate to arm CF. Since arm ED equals arm CF, the movement of point B either away from or toward center pivot C (e. g., along arc BB') will bear the same ratio to the corresponding movement of point D (in the example given, along arc DD') as the ratio between BC and AC. Since the arc of movement of A will be identical to that of point D, it follows that the points A and B will make proportionate movement in the ratio of their respective distances from center pivot C, i. e., their respective distances from C will always bear the same ratio for any given setting of the machine. Similarly, any movement of points A and B in which they swing arcuately at fixed distances from center C will sweep arcs AA" and BB" the magnitudes of which will be proportionate to each other in the same ratio. Correspondingly, any movement of points A and B in directions involving a combination of pivotal movement around center C and extending or retracting movement away from or towards center C, will involve proportionate movement of points A and B in the same ratio. In Fig. 1, where the two components of movement (arcuate swinging around center C and extending and retracting movement) are indicated in a manner similar to the showing in Fig. 8, the diagonal lines B'B" and A'A" indicate the resultants of the combination of the two components of movement which resultants are in the same ratio.

In the arrangement of Fig. 1, the reduction ratio may be easily determined as the ratio of BC to AC. A typical reduction ratio for example is 4.8/7.8 which equals .61. By interchanging the tracer point and engraving unit without shifting arm 32, an enlargement ratio of 7.8/4.8 which equals 1.62 will be obtained.

The height of tracer 31 in the Fig. 1 arrangement, and of depth gage 31 in the Fig. 7 arrangement is adjusted so that arms 13, 15, 9 and 32 will be parallel to the working surface. Initial cutter height may be adjusted in the tool chuck to suit the thickness of the workpiece while further adjustment for cutting depth is made by the micro depth gage 72' on the tracer point. Where the workpiece thickness is excessive, the machine is raised above the work surface with a piece of the same thickness inserted under the fulcrum base clamp 1. Radial graduations on dial 72' register with a gage mark scribed on the clamp 68 for ease of depth control on fine work.

The entire machine may be lifted from the work surface at any time and rested in an upstanding position. To prevent the machine swinging to one side when tilted up, I provide a wire yoke 106 to receive arm 18, the ends of the yoke being pivotally mounted in holes 107 in the base clamp 1. Yoke 107 has angular bends extending inwardly around base clamp 1 which hold yoke substantially upright.

Another important characteristic of the invention is the provision for both static and dynamic balancing, static balancing being effected by the positioning of weight 20 thereby compensating for the weight shift of the linkage for each ratio of reproduction, and dynamic balancing being effected by the tracer actuated linkage which automatically adjusts counter-weight 20 and 28 thereby balancing the machine in all positions of extension and retraction of the linkage.

A further important use of the invention is in reproducing three-dimensional objects. Movement of the linkage upward about the axis of horizontal fulcrum pivots 4 will result in a movement of cutter 63 at a reduced rate in respect of the movement of tracer point 76 in Fig. 1 or at a magnified rate in Fig. 7, the rates being in the same proportion as the proportional movements in a horizontal plane as described previously. Thus a three-dimensional reproduction, in accurate proportion in all dimensions, may be effected.

The free rotatable mounting of chip blower fan 67 on spindle 66 protects the hands of a workman from any serious injury from accidental contact with the fan during rotation thereof.

The cushioned mounting of the light socket on the engraving tool head protects the electric lamp against filament deteriorating vibration and lengthens filament life. The mounting of the light on the engraving head provides for uniform illumination of the engraving tool in all positions of operation, the lamp travelling with the engraving tool. The clips 8 and 29 function to support the service cord 92 for movement with the linkage in such a manner as to avoid interfering with the operation thereof, and to maintain the cord at all times out of the way of the operator's movements.

The counterbalancing mechanism will function to balance the machine both in enlarging and reducing arrangements and in all the different ratio settings of the linkage for both arrangements. It also makes it possible to operate the linkage from the tracer point with utmost ease.

The matched and coded index holes on the link arms greatly facilitate the setting of the linkage to selected ratios.

The engraving tool motor supporting bracket is adapted to receive a conventional portable engraving tool motor unit, therefore the rest of the machine constitutes an attachment, for an owner of such a portable tool, who saves the price of the required drive motor.

By substituting longer linkage arms, the machine may be readily adapted to operate over larger areas and for greater ratios of reduction and enlargement. The machine lends itself to such substitution with a minimum of difficulty.

One of the primary advantages of the machine is its need for only four main operating pivots.

Another basic advantage of the machine is its adaptability to linkage ratio adjustment without disturbing the linkage pivots or their adjustment.

Another advantage of the machine is the wide range of linkage ratios that are possible for either enlarging or reducing i. e. three sixteenths ($\frac{3}{16}$)

to three quarters (¾) reduction; and one and one third (1⅓) to five and one third (5⅓) enlargement.

Another improved characteristic of the machine is the provision for a depth gage adjustable for both large and extremely small variations of work depth.

A further advantage of the machine is its provision for operation either in enlarging or reducing ratios with nearly the same tracer actuating force required for both.

One of the most important improvements in the machine is the provision for both enlarging and reducing by interchanging the position of the tracer and the engraving tool.

In the appended claims, the pivot 12 is referred to as a "fulcrum pivot," the pivots 11 and 33 are referred to as "lateral pivots," the pivot 39 is referred to as a "remote pivot," the arms 9 and 13 are referred to as "inner arms" and the arms 15 and 32 are referred to as "outer arms."

Also, arms 13 and 15 are referred to as "longitudinal arms" and arms 9 and 32 are referred to as "transverse arms."

The phrase "configuration duplicating," as used in the claims, embraces engraving machines and similar machines utilizing a cutting tool (such as a cutting torch) for contour cutting operations.

I claim:

1. In a configuration duplicating machine, a fulcrum, operating linkage comprising inner and outer longitudinal arms and inner and outer transverse arms, a fulcrum pivot pivotally connecting said inner arms to each other and to said fulcrum, a pair of lateral pivots pivotally connecting said inner arms to said outer arms, and a remote pivot pivotally connecting said outer arms to each other, said outer longitudinal arm being extended in a straight line beyond said remote pivot to form an extension arm, means for dynamically counterbalancing said operating linkage in all positions of extension and retraction thereof for any selected ratio setting thereof, and means for adjusting said counterbalancing means to statically balance the linkage for all ratio settings thereof, said counterbalancing means including counterweights disposed generally opposite the respective inner arms across said fulcrum pivot therefrom, and linkage connecting one of said counterweights to said operating linkage for extending said one counterweight away from the fulcrum pivot when said operating linkage is extended away from the fulcrum pivot and vice versa.

2. In a configuration duplicating machine, a fulcrum, parallelogram operating linkage including a pair of inner arms; a fulcrum pivot pivotally connecting said inner arms to each other and to said fulcrum; a pair of outer arms pivotally connected to the outer ends of said inner arms and to each other, for extension away from said fulcrum and vice versa; means hinging said fulcrum pivot to said fulcrum on a horizontal axis; and counterweight mechanism for balancing the operating linkage including a counterweight disposed generally opposite one of said inner arms and an adjustable counterweight disposed in a position generally opposite the other inner arm across said fulcrum pivot, and linkage connecting said adjustable counterweight to said operating linkage for extending said adjustable counterweight away from the fulcrum pivot when said linkage is extended away from the fulcrum pivot and vice versa.

3. A configuration duplicating machine as defined in claim 2, wherein said counterweight adjusting linkage comprises a pusher arm pivotally connected at one end to said adjustable counterweight and having at its other end a pivotal connection to said first mentioned counterweight, which pivotal connection is adjustable toward and from said fulcrum axis whereby to vary the amplitude of adjusting movement of said adjustable counterweight.

4. An engraving tool unit for an engraving machine including parallelogram operating linkage having a pair of inner arms, a fulcrum to which the inner ends of said inner arms are pivoted, a pair of outer arms pivotally connected to the outer ends of said inner arms and to each other; said engraving tool unit comprising a tool spindle, a mounting bracket in which said spindle is journalled, said mounting bracket having a pair of bores disposed at right angles to each other, one bore being adapted to receive one of said outer arms for mounting the engraving unit thereon, the other of said bores being adapted to receive the other of said outer arms for mounting the engraving unit thereon, a supporting arm receivable at one end in said one bore and having a transverse opening at its other end, an adjustable depth gage having a shaft receivable in said opening and a smooth bearing end to ride against a work surface for supporting said engraving tool spindle at a proper height relative to said work surface, and a yielding tracer point attachable to said one outer arm when said engraving tool spindle is thus supported by said depth gage.

5. An engraving machine as defined in claim 4, said other outer arm being extended beyond its pivotal connection with said one outer arm to provide an extension arm, and including a clamp having a split sleeve for receiving said one outer arm and having means for attachment of said yielding tracer point thereto, said clamp being adapted, when the engraving tool spindle is carried by said one outer arm, to receive the outer end of said extension arm and to extend horizontally therefrom, and having at its extended end a transverse opening which, in said horizontal position, will be disposed vertically to receive the shaft of said depth gage, said shaft having at its end opposite said bearing end, a tracer point adapted to function when said support unit is thus associated with said clamp.

6. In a configuration duplicating machine: a fulcrum; operating linkage comprising inner and outer longitudinal arms and inner and outer transverse arms, a fulcrum pivot pivotally connecting said inner arms to each other and to said fulcrum, a pair of lateral pivots pivotally connecting said inner arms to said outer arms, and a remote pivot pivotally connecting said outer arms to each other, said outer longitudinal arm being extended in a straight line beyond said remote pivot to form an extension arm; means for dynamically counterbalancing said operating linkage in all positions of extension and retraction thereof for any selected ratio setting thereof, said counterbalancing means including a counterweight disposed on the opposite side of said fulcrum pivot from said operating linkage, means supporting said counterweight for extending and retracting movement in a path such as to maintain the center of gravity of said counterbalancing means directly opposed to that of said operating linkage across said fulcrum pivot, linkage connecting said counterweight to said operating linkage for extending and retracting said counterweight respectively away from and toward the fulcrum pivot as said operating linkage is extended respectively away from and toward said fulcrum pivot; and means for adjusting said counterbalancing means to statically balance the linkage for all ratio settings thereof.

7. In a configuration duplicating machine: a fulcrum; parallelogram operating linkage including a pair of inner arms, a fulcrum pivot connecting said inner arms to each other and to said fulcrum on a vertical axis, a pair of outer arms pivoted to the outer ends of said inner arms, a remote pivot connecting the outer ends of said outer arms to each other, and an extension arm projecting beyond said remote pivot away from said fulcrum pivot; and means for dynamically counterbalancing said operating linkage in all positions of extension and retraction thereof, including a counterweight disposed on the opposite side of said fulcrum pivot from said operating linkage, means supporting said counterweight for extending and retracting movements in a path such as to maintain the center of gravity of said counterbalancing means directly opposed to that of said operating linkage across said fulcrum pivot, linkage connecting said counterweight to said operating linkage for extending and retracting said counterweight respectively away from and toward the fulcrum pivot as said operating linkage is extended respectively away from and toward said fulcrum pivot, and means for adjusting said counterbalancing means to statically balance the linkage for all ratio settings thereof.

8. In a configuration duplicating machine: a fulcrum; operating linkage comprising inner and outer longitudinal arms and inner and outer transverse arms, a fulcrum pivot pivotally connecting said inner arms to each other and to said fulcrum, a pair of lateral pivots pivotally connecting said inner arms to said outer arms, and a remote pivot pivotally connecting said outer arms to each other, said outer longitudinal arm being extended in a straight line beyond said remote pivot to form an extension arm; means for dynamically counterbalancing said operating linkage in all positions of extension and retraction thereof for any selected ratio setting thereof, said counterbalancing means comprising an arm slidably supported by one of said inner arms and projecting across said fulcrum pivot, a counterweight secured to said slidable arm, a counterweight arm connected to the other inner arm for swinging movement in unison therewith and projecting across said fulcrum pivot, a second counterweight attached to said counterweight arm, and a push-pull link connected between said counterweight arm and said slidable arm for utilizing angular displacement between said inner arms to effect telescopic movement of said slidable arm.

9. In a configuration duplicating machine: a fulcrum; operating linkage comprising inner and outer longitudinal arms and inner and outer transverse arms, a fulcrum pivot connecting said inner arms to each other and to said fulcrum, a pair of lateral pivots pivotally connecting said inner arms to said outer arms, a remote pivot pivotally connecting said outer arms to each other, and an extension arm projecting beyond said remote pivot away from said fulcrum pivot; and means for dynamically counterbalancing said operating linkage in all positions of extension and retraction thereof, including a counterweight disposed on the opposite side of said fulcrum pivot from said operating linkage, means supporting said counterweight for extending and retracting movements thereof with reference to the fulcrum pivot in a path such as to maintain the center of gravity of said counterbalancing means directly opposed to that of said operating linkage across said fulcrum pivot, and linkage connecting said counterweight to said operating linkage for extending and retracting said counterweight respectively away from and toward the fulcrum pivot as said operating linkage is extended respectively away from and toward said fulcrum pivot.

10. The machine defined in claim 9, wherein one of said inner arms is tubular; wherein said counterweight supporting means comprises an arm telescopically slidable in said tubular arm and projecting across the axis of said fulcrum pivot, said counterweight being secured to said slidable arm; and wherein said connecting linkage is connected between said slidable arm and the other of said inner arms in a manner to utilize angular displacement of the latter relative to said tubular arm, for effecting the telescopic movement of said slidable arm.

11. In a configuration duplicating machine: a fulcrum; parallelogram operating linkage including a pair of inner arms, a fulcrum pivot connecting said inner arms to each other and to said fulcrum on a vertical axis, a pair of outer arms pivoted to the outer ends of said inner arms, a remote pivot connecting the outer ends of said outer arms to each other; and an extension arm projecting beyond said remote pivot away from said fulcrum pivot; and means for dynamically counterbalancing said operating linkage in all positions of extension and retraction thereof, including a counterweight disposed on the opposite side of said fulcrum pivot from said operating linkage, means supporting said counterweight for extending and retracting movements in a path such as to maintain the center of gravity of said counterbalancing means directly opposed to that of said operating linkage across said fulcrum pivots, linkage connecting said counterweight to said operating linkage for extending and retracting said counterweight respectively away from and toward the fulcrum pivot as said operating linkage is extended respectively away from and toward said fulcrum pivot; and means hinging said fulcrum pivot to said fulcrum on a horizontal axis to accommodate counterbalanced vertical movement of said operating linkage for three dimensional engraving operations.

12. In a configuration duplicating machine: a fulcrum; operating linkage comprising inner and outer longitudinal arms and inner and outer transverse arms, a fulcrum pivot pivotally connecting said inner arms to each other and to said fulcrum, a pair of lateral pivots pivotally connecting said inner arms to said outer arms, and a remote pivot pivotally connecting said outer arms to each other, said outer longitudinal arm being extended in a straight line beyond said remote pivot to form an extension arm; all of said pivots being disposed inwardly of the inner sides of said longitudinal arms; a tool bracket having a pair of split sleeves defining a pair of bearing bores the respective axes of which are disposed at right angles to each other and having a tool connection for carrying a tool on a vertical axis offset laterally from one of said bearing bores a distance corresponding to the inward spacing of said pivots from said longitudinal arm, whereby the bracket may be mounted with the latter bore receiving a longitudinal arm and the tool axis aligned with the two pivots thereof, the other bore being adapted to receive one of the transverse arms; and a tracer point clamp having a split sleeve likewise adapted to receive either of said arms and having means to hold a tracer point thereon.

13. Apparatus as defined in claim 12, wherein said tracer point clamp includes means at one end to clampingly engage one of said arms in a position in which said clamp projects downwardly and to clampingly engage the other of said arms in a position projecting horizontally and laterally therefrom, said clamp having at its other end a pair of holes, one extending longitudinally and the other extending laterally thereof, the length of said tracer point clamp being such as to dispose the last mentioned hole at a distance from the supporting arm the same as the inward spacing of said pivots from said longitudinal arms; a relatively short tracer point mountable in said longitudinal hole and operable when the clamp projects downwardly, and a longer tracer point mountable in said transverse hole and operable when the clamp projects horizontally.

14. In a configuration duplicating machine: a fulcrum; operating linkage comprising inner and outer longitudinal arms and inner and outer transverse arms, a fulcrum pivot pivotally connecting said inner arms to each other and to said fulcrum, a pair of lateral pivots pivotally connecting said inner arms to said outer arms and to each other, said outer longitudinal arm being extended in a straight line beyond said remote pivot to form an extension arm; means for dynamically counterbalancing said operating linkage in all positions of extension and retraction thereof for any selected ratio setting thereof, said counterbalancing means including a counterweight disposed on the opposite side of said fulcrum pivot from said operating linkage, means supporting said counterweight for extending and retracting movement in a path such as to maintain the center of gravity of said counterbalancing means directly opposed to that of said operating linkage across said fulcrum pivot, linkage connecting said counterweight to said operating linkage for extending and retracting said counterweight respectively away from and toward the fulcrum pivot as said operating linkage is extended respectively away from and toward said fulcrum pivot; an engraving head carried by one of said outer arms, said engraving head including an electric motor, a service cord for connecting said motor to a source of electric power, and a pair of cord clips carried by the inner transverse arm, one of said clips being disposed at said fulcrum pivot and the other being disposed at the pivot connecting said inner transverse arm to the outer longitudinal arm, whereby when said engraving head is attached to said extension arm, said cord may be supported in both of said clips, whereas when the engraving head is attached to said outer transverse arm, said cord may be supported only in the clip at the fulcrum pivot.

PAUL G. GLEASON.

REFERENCES CITED

The following references are of record in the file of this patent:

UNITED STATES PATENTS

| Number | Name | Date |
|---|---|---|
| 192,907 | Ellinwood | July 10, 1877 |
| 260,463 | Earle | July 4, 1882 |
| 350,027 | Wang | Sept. 28, 1886 |
| 623,748 | Walters | Apr. 25, 1899 |
| 1,059,271 | Buchnam | Apr. 15, 1913 |
| 1,175,274 | Klorer | Mar. 14, 1916 |
| 1,251,437 | Stenitzer | Dec. 25, 1917 |
| 1,471,869 | Turner | Oct. 23, 1923 |
| 1,516,897 | Tuska et al. | Nov. 25, 1924 |
| 1,617,312 | Braren | Feb. 8, 1927 |
| 1,696,032 | Glover | Dec. 18, 1928 |
| 1,843,424 | Husy | Feb. 2, 1932 |
| 2,017,843 | Cuthbert | Oct. 22, 1935 |
| 2,095,865 | Gorton | Oct. 12, 1937 |
| 2,132,452 | Zwick | Oct. 11, 1938 |
| 2,240,825 | Alexander | May 6, 1941 |
| 2,244,150 | Greve | June 3, 1941 |
| 2,350,704 | Schnable | June 6, 1944 |
| 2,411,718 | Feld | Nov. 26, 1946 |

FOREIGN PATENTS

| Number | Country | Date |
|---|---|---|
| 11,306 | Germany | Oct. 26, 1880 |
| 566,794 | England | Jan. 15, 1945 |